United States Patent Office 3,353,977
Patented Nov. 21, 1967

3,353,977
PRODUCTION OF POLYHALOGENATED COPPER PHTHALOCYANINES HAVING HIGH COLOR STRENGTH AND SOFT GRAIN
Joachim Kranz, Ludwigshafen (Rhine), and Rudolf Polster, Frankenthal, Pfalz, Germany, assignors to Badische Anilin- & Soda-Fabrik Aktiengesellschaft, Ludwigshafen (Rhine), Germany
No Drawing. Filed July 8, 1965, Ser. No. 470,573
Claims priority, application Germany, July 18, 1964, B 77,738
5 Claims. (Cl. 106—288)

ABSTRACT OF THE DISCLOSURE

Process for production of polyhalogenated copper phthalocyanines having high color strength and soft grain by heating said phthalocyanines at 60° to 220° C. for at least one hour with one to twenty times by weight of an o-nitrophenol.

This invention relates to a process for the production of polyhalogenated copper phthalocyanines which high color strength and soft grain using nitrophenols.

Polyhalogenated phthalocyanines are formed in a form unsuitable for use as a pigment when they are synthesized. Various methods are known for converting the crude dye into a useful pigment. For example the crude phthalocyanine may be dissolved or suspended in sulfuric acid and reprecipitated in finely divided form by pouring it into water. It is also possible to bring the dye into a suitable pigment form by kneading it in the presence of organic or inorganic substances or by grinding it with inorganic salts. Highly halogenated phthalocyanines may also be advantageously changed by heating them with water in an autoclave, if desired in the presence of organic or inorganic reagents.

All these methods, however, require a considerable expense for apparatus or the use of large amounts of sulfuric acid. Moreover the results are often unsatisfactory and the individual methods can usually only be used with advantage for a specific pigment.

It is therefore the object of this invention to provide a process which permits the conversion of any polyhalogenated copper phthalocyanine in a simple manner into a pigment form without the abovementioned disadvantages having to be incurred.

We have found that any polyhalogenated copper phthalocyanine having from ten to sixteen halogen atoms can be converted into a pigment form which has high color strength and a soft grain by heating the crude pigment (i.e. the product formed by halogenation) at about 60° to 220° C. in the presence of about once to twenty times, preferably twice to six times, and particularly twice to four times the weight (with reference to the crude pigment) of an o-nitrophenol.

The nitrophenols may be all products formed for example by nitration of phenol, including nitrophenol mixtures, or homologues, such as o-nitro-p-cresol, and also dinitrophenols. For technical reasons, however, o-nitrophenol (which is readily accessible from o-nitrochlorobenzene) is preferred.

For the conversion of polyhalogenated crude pigments in accordance with this invention, a dry crude pigment or advantageously the moist pressed material (containing for example about 50 to 80% of water) of an already polyhalogenated copper phthalocyanine may be used such as is obtained in halogenation by conventional methods. For example the chosen amount of o-nitrophenol may be added, the whole heated to 100° to 220° C., preferably to 130° to 160° C., and the water thereby distilled off. Conversion into a pigment form will proceed however also at temperatures below 100° C., for example at 80° C., or in the case of polyhalogenated copper phthalocyanine which contains chlorine and bromine even at 60° C., through more slowly than at higher temperatures. A preferred embodiment of the present process consists in using the crude product as moist pressed material and not distilling off the water contained therein but carrying out the conversion in a closed vessel under superatmospheric pressure. An advantageous temperature range for this has proved to be that of from 100° to 150° C.

The duration of the heating of the crude pigment with the nitrophenol depends on the temperature used. As a rule one to six hours', preferably two to four hours', heating is necessary for the conversion into the pigment form to be complete. Although more prolonged heating is not injurious, it does not lead to any further improvement in the pigment properties.

It is very simple to work up the pigment mixture. Dilute alkali is added to the reaction mixture so that the nitrophenol passes into solution and the pigment may be isolated by filtration. The o-nitrophenols which are sparingly soluble in water may be recovered to an extent of 90 to 95% from the alkaline filtrate by acidification and may be used again without further purification.

Both chlorinated and chlorinated-brominated copper phthalocyanines may be used as polyhalogenated copper phthalocyanines containing from ten to sixteen carbon atoms to be converted by the process according to this invention into a pigment form which has high color strength and a soft grain. The polyhalogenated copper phthalocyanines may contain for example ten to sixteen chlorine atoms, or up to thirteen, preferably four to twelve, chlorine atoms and in the same molecule two to fourteen, preferably four to twelve, bromine atoms. Commercially available polyhalogenated copper phthalocyanines contain about 15 to 16 atoms of chlorine, about ten atoms of chlorine and six atoms of bromine, or about thirteen atoms of bromine and three atoms of chlorine per molecule.

Pigments obtainable according to this invention are distinguished by high color strength, very good powder softness and a green shade which is more yellowish than the crude pigment.

The following examples will illustrate the invention. Part, when not otherwise stated, are by weight. Percentages are percentages by weight.

Example 1

1,250 parts of an aqueous pressed cake having a content of about 40% of highly chlorinated copper phthalocyanine (chlorine content 49.5%) is heated in a closed vessel with 900 parts of o-nitrophenol while stirring at 130° to 140° C., so that a pressure of about 4 atmospheres is set up. The mixture is heated for about three hours, allowed to cool to 70° to 80° C. and the calculated amount of 10% caustic soda solution is added. The pigment is then filtered off, the pigment cake is washed with warm water and dried. A green copper phthalocyanine pigment is obtained which has high color strength and which is distinguished by great purity of shade and excellent powder softness.

90% of o-nitrophenol is recovered from the o-nitrophenol solution as a moist product for reuse by acidification with mineral acid and cooling.

Instead of heating in a closed vessel, the water may be first distilled off and then heated to the desired temperature in an open vessel.

A pigment having similar properties is obtained when 750 parts of the abovementioned pressed cake is heated with 900 parts of o-nitrophenol at 150° C. for five hours and then worked up as described above.

Similarly good results are obtained when the mixture is heated to about 100° C. for three to five hours or to 120° C. for three to five hours.

Example 2

100 parts of an aqueous pressed cake having a content of 26.4% of halogenated copper phthalocyanine (chlorine content 26%, bromine content 33%) is treated with 80 parts of o-nitrophenol as described in Example 1. 26 parts of a yellowish green pigment is obtained which exhibits great purity and good grain softness.

Example 3

100 parts of an aqueous pressed cake having a content of 28.4% of halogenated copper phthalocyanine (chlorine content 7%, bromine content 58%) is treated with 100 parts of o-nitrophenol as described in Example 1. A good yield of a green pigment is obtained which has excellent powder softness, great color strength and purity, and a yellowish tinge.

By following the same procedure but heating for five hours under reflux, a pigment having the same properties is obtained. Very good results are also obtained when heating at 100° to 120° C. for four hours.

Example 4

84 parts of the aqueous pressed cake described in Example 3 is heated with 70 parts of o-nitro-p-cresol as described in Example 1 and a pigment is obtained having similar properties to that in Example 3.

Example 5

100 parts of an aqueous pressed cake having a content of 33.5% of halogenated copper phthalocyanine (chlorine content 26%, bromine content 33%) is treated as described in Example 1 with 134 parts of a mixture of equal amounts of o-nitrophenol and p-nitrophenol such as is obtained in the nitration of phenol with nitric acid (J. Prakt. Chem. (2) 120, 187). A pigment is thus obtained having similar properties to the product of Example 2.

A similar pigment is obtained by heating at 100 to 120° C. for two to four hours or at 150° C. for two hours.

Example 6

100 parts of a moist pressed cake having a content of 37% of polychloro copper phthalocyanine (49.5% chlorine) is treated as described in Example 1 with a mixture of 111 parts of o-nitrophenol and 37 parts of p-nitrophenol (prepared by nitration of phenol by means of a mixture of nitric acid and sulfuric acid). A green phthalocyanine pigment is obtained having high color strength and similar properties to the product of Example 1.

An equally good pigment is obtained by heating at 100 to 120° C. for two to four hours or at 150° C. for two hours.

Example 7

100 parts of an aqueous pressed cake (such as is used in Example 3) and 112 parts of 2,4-dinitrophenol are heated as described in Example 1 and the mixture is worked up as described in Example 1. The pigment obtained has the same properties as that described in Example 3.

Example 8

75 parts of moist pressed material having a content of 35% of halogenated copper phthalocyanine (chlorine content 26%, bromine content 33%) is heated with 105 parts of a crude dinitrophenol mixture (prepared according to Marqueyrol and Loriette, Bull. Soc. France (4) 25, 375; Beilstein 6, 251) at 130° to 150° C. and the whole is worked up as described in Example 1. The yellowish green pigment obtained is equivalent in all properties to that prepared according to Example 3.

A very good pigment is also obtained by heating the mixture at 100° to 120° C. for four hours or at 150° C. for two hours.

We claim:

1. a process for the production of a polyhalogenated copper phthalocyanine which has great color strength and a soft texture which comprises heating to a temperature ranging from 60° to 220° C. for at least one hour a polyhalogenated copper phthalocyanine containing from 10 to 16 halogen atoms selected from the group consisting of chlorine and bromine with once to twenty times the amount by weight of an o-nitrophenol thereafter adding dilute alkali to the resultant mixture in an amount sufficient to dissolve the o-nitrophenol and separating the pigment from the o-nitrophenol-containing dilute alkali.

2. A process for the production of a polyhalogenated copper phthalocyanine which has great color strength and a soft texture which comprises heating for one to six hours to a temperature ranging from 100° to 150° C. a wet pressed cake of a polyhalogenated copper phthalocyanine containing from 10 to 16 halogen atoms selected from the group consisting of chlorine and bromine with twice to four times the amount of o-nitrophenol in a sealed vessel thereafter adding dilute alkali to the resultant mixture in an amount sufficient to dissolve the o-nitrophenol and separating the pigment from the o-nitrophenol-containing dilute alkali.

3. A process as claimed in claim 1 wherein the polyhalogenated copper phthalocyanine is copper phthalocyanine containing from 15 to 16 chlorine atoms per molecule.

4. A process as claimed in claim 1 wherein the polyhalogenated copper phthalocyanine is copper phthalocyanine containing approximately 10 chlorine and 6 bromine atoms per molecule.

5. A process as claimed in claim 1 wherein the polyhalogenated copper phthalocyanine is copper phthalocyanine containing approximately 13 bromine and 3 chlorine atoms per molceule.

References Cited

UNITED STATES PATENTS

| | | | |
|---|---|---|---|
| 2,723,981 | 11/1955 | Tullsen | 260—314.5 |
| 3,006,922 | 10/1961 | Geiger | 260—314.5 |
| 3,030,370 | 4/1962 | Jackson | 106—288 |
| 3,256,285 | 6/1966 | Fuchs et al. | 106—288 |

TOBIAS E. LEVOW, *Primary Examiner.*

HELEN McCARTHY, *Examiner.*

J. E. POER, *Assistant Examiner.*